United States Patent
Akimoto et al.

(10) Patent No.: US 7,937,992 B2
(45) Date of Patent: *May 10, 2011

(54) ENGINE MISFIRE DETECTION APPARATUS, HYBRID VEHICLE EQUIPPED WITH THE SAME, AND ENGINE MISFIRE DETECTION METHOD

(75) Inventors: Hikokazu Akimoto, Aichi-gun (JP); Takahiro Nishigaki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 651 days.

This patent is subject to a terminal disclaimer.

(21) Appl. No.: 11/988,277

(22) PCT Filed: Nov. 24, 2006

(86) PCT No.: PCT/JP2006/323494
§ 371 (c)(1),
(2), (4) Date: Jan. 4, 2008

(87) PCT Pub. No.: WO2007/086187
PCT Pub. Date: Aug. 2, 2007

(65) Prior Publication Data
US 2010/0071448 A1    Mar. 25, 2010

(30) Foreign Application Priority Data
Jan. 27, 2006   (JP) ................................ 2006-019031

(51) Int. Cl.
*G01M 15/11*    (2006.01)
(52) U.S. Cl. .................. 73/114.03; 73/114.04

(58) Field of Classification Search ............... 73/114.02, 73/114.03, 114.04
See application file for complete search history.

(56) References Cited

U.S. PATENT DOCUMENTS

| | | | | |
|---|---|---|---|---|
| 5,440,921 A * | 8/1995 | Matsuno et al. | ........... | 73/114.04 |
| 5,440,922 A | 8/1995 | Ichikawa | | |
| 6,112,149 A * | 8/2000 | Varady et al. | ................. | 701/111 |
| 7,117,727 B2 * | 10/2006 | Ohsaki et al. | .............. | 73/114.04 |
| 7,117,728 B2 * | 10/2006 | Kiyomura et al. | ......... | 73/114.04 |
| 7,467,033 B2 * | 12/2008 | Miller et al. | ..................... | 701/22 |
| 7,503,207 B2 * | 3/2009 | Nishigaki et al. | .......... | 73/114.02 |
| 7,503,208 B2 * | 3/2009 | Akimoto et al. | ........... | 73/114.03 |
| 7,543,483 B2 * | 6/2009 | Akimoto et al. | ........... | 73/114.03 |
| 7,665,558 B2 * | 2/2010 | Akimoto et al. | ........... | 180/65.28 |
| 2009/0158829 A1 * | 6/2009 | Suzuki | ...................... | 73/114.02 |
| 2010/0030455 A1 * | 2/2010 | Akimoto | ...................... | 701/111 |
| 2010/0031736 A1 * | 2/2010 | Kushihama et al. | ........ | 73/114.04 |
| 2010/0114460 A1 * | 5/2010 | Akimoto | ...................... | 701/111 |

FOREIGN PATENT DOCUMENTS
JP    A-4-171249    6/1992
(Continued)

*Primary Examiner* — Freddie Kirkland, III
(74) *Attorney, Agent, or Firm* — Oliff & Berridge, PLC

(57) ABSTRACT

The engine misfire detection process of the invention sets a first threshold value and second threshold values to be referred to for detection of an engine misfire and detects an engine misfire based on the settings of the first threshold value and the second threshold values and 360-degree differences. The engine misfire detection process of the invention detects the occurrence of an engine misfire at each gear position of the transmission by taking into account the varying effects of the operating conditions of a motor the transmission, and a planetary gear mechanism on the crankshaft of the engine.

8 Claims, 11 Drawing Sheets

FOREIGN PATENT DOCUMENTS

| | | |
|---|---|---|
| JP | A-2000-120488 | 4/2000 |
| JP | A-2000-240501 | 9/2000 |
| JP | A-2001-317402 | 11/2001 |
| JP | A-2003-286894 | 10/2003 |
| JP | A-2005-170317 | 6/2005 |
| WO | WO 2005/017803 A1 | 2/2005 |

* cited by examiner

ENGINE MISFIRE DETECTION APPARATUS, HYBRID VEHICLE EQUIPPED WITH THE SAME, AND ENGINE MISFIRE DETECTION METHOD

TECHNICAL FIELD

The present invention relates to an engine misfire detection apparatus, a hybrid vehicle equipped with the engine misfire detection, and an engine misfire detection method.

BACKGROUND ART

One proposed structure of an engine misfire detection apparatus detects a misfire of an engine in a power output apparatus, based on an output torque command value of a first motor generator (see, for example, Patent Document 1). The power output apparatus includes the engine, a planetary gear mechanism having a carrier and a ring gear respectively linked with a crankshaft of the engine and with an axle, a first motor generator linked with a sun gear of the planetary gear mechanism, and the second motor generator linked with the axle. In the power output apparatus, the output torque of the first motor generator is varied in synchronism with the explosive combustion timing of the engine, in order to control the potential vibrations due to the torque pulsation of the engine. The occurrence of an engine misfire is detected in response to a significant fall of the output torque command value from a previous value. In another proposed structure of the power output apparatus, the second motor generator is linked with the axle via a transmission (see, for example, Patent Document 2).
Patent Document 1: Japanese Patent Laid-Open Gazette No. 2000-240501
Patent Document 2: Japanese Patent Laid-Open Gazette No. 2005-170317

DISCLOSURE OF THE INVENTION

In the power output apparatus disclosed in Patent Document 2, the gear ratio of a rotating shaft of the second motor generator to a driveshaft linked with the crankshaft or output shaft of the engine is varied according to the gear position of the transmission. The changed gear position may thus vary the effects of the operating conditions of the transmission, the driveshaft, and the planetary gear mechanism on the crankshaft of the engine. The engine misfire detection apparatus disclosed in Patent Document 1 does not take into account the varying effects according to the gear position of the transmission for detection of an engine misfire. There is accordingly a demand for ensuring accurate detection of an engine misfire in a power output apparatus including a transmission.

In an engine misfire detection apparatus for detection of a misfire in an internal combustion engine that is included in a power output apparatus having a transmission mechanism linked with both a motor and a driveshaft, a hybrid vehicle equipped with the engine misfire detection apparatus, and a corresponding engine misfire detection method, there is a need of ensuring accurate detection of an engine misfire.

In order to satisfy at least part of the above and the other related requirements, the engine misfire detection apparatus, the hybrid vehicle equipped with the engine misfire detection apparatus, and the corresponding engine misfire detection method have the configurations discussed below.

According to one aspect, the present invention is directed to an engine misfire detection apparatus for detection of a misfire in a multi-cylinder internal combustion engine included in a power output apparatus, where the power output apparatus includes the multi-cylinder internal combustion engine having a crankshaft mechanically linked with a driveshaft, a motor that outputs power to the driveshaft, and a transmission mechanism that transmits power between a rotating shaft of the motor and the driveshaft with a change in gear position. The engine misfire detection apparatus includes: a rotational position detection unit that detects a rotational position of the crankshaft of the internal combustion engine;
a unit angle rotation time computation module that computes a unit angle rotation time required for rotation of an output shaft of the internal combustion engine by every predetermined unit rotation angle according to the detected rotational position;
a threshold value setting module that sets a specific threshold value used for detection of an engine misfire according to a gear position of the transmission mechanism; and
an engine misfire detection module that detects an engine misfire based on the computed unit angle rotation times and the set specific threshold value.

The engine misfire detection apparatus of the invention detects the rotational position of the crankshaft of the internal combustion engine, computes the unit angle rotation time required for rotation of the output shaft of the internal combustion engine by every predetermined unit rotation angle according to the detected rotational position, sets the specific threshold value used for detection of an engine misfire according to the gear position of the transmission mechanism, and detects an engine misfire based on the computed unit angle rotation times and the set specific threshold value. The change gear ratio of the rotating shaft of the motor to the driveshaft mechanically linked with the crankshaft of the internal combustion engine is varied according to the gear position of the transmission mechanism. The changed gear position may thus vary the effects of the operating conditions of the motor and the transmission mechanism on the crankshaft of the internal combustion engine. The specific threshold value used for detection of the engine misfire is set according to the gear position of the transmission mechanism. This arrangement ensures accurate detection of a misfire in the internal combustion engine.

In one aspect of the engine misfire detection apparatus of the invention, the threshold value setting module sets a smaller value to the specific threshold value at a higher gear position of the transmission mechanism. The engine misfire detection apparatus of this aspect adequately sets the specific threshold value used for detection of the engine misfire according to the gear position of the transmission mechanism. In another aspect of the engine misfire detection apparatus of the invention, the threshold value setting module sets the specific threshold value to decrease with an increase in rotation speed of the internal combustion engine. The engine misfire detection apparatus of this aspect adequately sets the specific threshold value used for detection of the engine misfire according to the rotation speed of the internal combustion engine. The threshold value setting module may estimate the rotation speed of the internal combustion engine according to the rotational position of the crankshaft detected by the rotational position detection unit.

In one preferable embodiment of the engine misfire detection apparatus of the invention, the threshold value setting module sets a first threshold value and a second threshold value according to the gear position of the transmission mechanism. The engine misfire detection module makes a tentative decision on an engine misfire when any of the computed unit angle rotation times is greater than the first threshold value. After the tentative decision on the engine misfire, the engine misfire detection module specifies an object unit angle rotation time that is greater than the first threshold value among the computed unit angle rotation times and makes a final decision on the engine misfire when a ratio of a unit angle rotation time of a different cylinder, which is different from a target cylinder corresponding to the specified object unit angle rotation time, to the specified object unit angle rotation time is in a range defined by the second threshold value. The engine misfire detection apparatus of this embodiment makes the tentative decision and the final decision on the engine misfire in this manner and thus desirably enhances the accuracy of detection of the engine misfire. The first threshold value and the second threshold value respectively used for the tentative decision and for the final decision on the engine misfire are set according to the gear position of the transmission mechanism. This further enhances the accuracy of detection of the engine misfire.

In one aspect of the engine misfire detection apparatus of the above embodiment, when a rotation speed of the internal combustion engine is out of a predetermined range, the threshold value setting module sets an identical value to the first threshold value used for detection of an engine misfire in a preset first misfire pattern and to the first threshold value used for detection of an engine misfire in a preset second misfire pattern. When the rotation speed of the internal combustion engine is within the predetermined range, the threshold value setting module sets different values to the first threshold value used for detection of the engine misfire in the preset first misfire pattern and to the first threshold value used for detection of the engine misfire in the preset second misfire pattern. The engine misfire detection module detects the engine misfire in the preset first misfire pattern based on the computed unit angle rotation times and the set first threshold value used for detection of the engine misfire in the preset first misfire pattern, while detecting the engine misfire in the preset second misfire pattern based on the computed unit angle rotation times and the set first threshold value used for detection of the engine misfire in the preset second misfire pattern. When the rotation speed of the internal combustion engine is out of the predetermined range, identical values are set to the first threshold value for the first misfire pattern and to the first threshold value for the second misfire pattern. This desirably simplifies the detection of the engine misfire. When the rotation speed of the internal combustion engine is within the predetermined range, on the other hand, different values are set to the first threshold value for the first misfire pattern and to the first threshold value for the second misfire pattern. This desirably enhances the accuracy of detection of the engine misfire. In the engine misfire detection apparatus of this aspect, the threshold value setting module may set a first threshold value for a single misfire used for detection of an engine misfire in a single misfire pattern where only one cylinder among the multiple cylinders is misfired as the first threshold value used for detection of the engine misfire in the preset first misfire pattern. The threshold value setting module may set a first threshold value for consecutive misfires used for detection of an engine misfire in a consecutive misfire pattern where two consecutive cylinders among the multiple cylinders are misfired as the first threshold value used for detection of the engine misfire in the preset second misfire pattern.

One preferable structure of the power output apparatus, to which the engine misfire detection apparatus of the invention is applied, has: a three shaft-type power input output mechanism that is linked to three shafts, an output shaft of the internal combustion engine, the driveshaft, and a third shaft, and inputs and outputs power from and to a residual one shaft based on powers input from and output to any two shafts among the three shafts; and a generator that inputs and outputs power from and to the third shaft.

The present invention is also directed to a hybrid vehicle that is equipped with a power output apparatus and with the engine misfire detection apparatus having any of the arrangement described above for detection of a misfire in a multi-cylinder internal combustion engine included in a power output apparatus. The power output apparatus includes: the multi-cylinder internal combustion engine having a crankshaft mechanically linked with a driveshaft; a motor that outputs power to the driveshaft; and a transmission mechanism that transmits power between a rotating shaft of the motor and the driveshaft with a change in gear position. As discussed previously, the engine misfire detection apparatus enables accurate detection of a misfire in the internal combustion engine included in the power output apparatus, which has the transmission mechanism linked with both the motor and the driveshaft. The hybrid vehicle of the invention equipped with this engine misfire detection apparatus thus exerts the similar effects.

According to another aspect, the present invention is directed to an engine misfire detection method for detecting a misfire in a multi-cylinder internal combustion engine included in a power output apparatus, where the power output apparatus includes the multi-cylinder internal combustion engine having a crankshaft mechanically linked with a driveshaft, a motor that outputs power to the driveshaft, and a transmission mechanism that transmits power between a rotating shaft of the motor and the driveshaft with a change in gear position. The engine misfire detection method includes:

detecting a rotational position of the crankshaft of the internal combustion engine;

computing a unit angle rotation time required for rotation of an output shaft of the internal combustion engine by every predetermined unit rotation angle according to the detected rotational position;

setting a specific threshold value used for detection of an engine misfire according to a gear position of the transmission mechanism; and detecting an engine misfire based on the computed unit angle rotation times and the set specific threshold value.

The engine misfire detection method of the invention detects the rotational position of the crankshaft of the internal combustion engine, computes the unit angle rotation time required for rotation of the output shaft of the internal combustion engine by every predetermined unit rotation angle according to the detected rotational position, sets the specific threshold value used for detection of an engine misfire according to the gear position of the transmission mechanism, and detects an engine misfire based on the computed unit angle rotation times and the set specific threshold value. The change gear ratio of the rotating shaft of the motor to the driveshaft mechanically linked with the crankshaft of the internal combustion engine is varied according to the gear position of the transmission mechanism. The changed gear position may thus vary the effects of the operating conditions of the motor and the transmission mechanism on the crankshaft of the internal combustion engine. The specific threshold value used for detection of the engine misfire is set according to the gear position of the transmission mechanism. This arrangement ensures accurate detection of a misfire in the internal combustion engine. The engine misfire detection method of the invention may adopt any of the diverse arrangements of the engine misfire detection apparatus described above. The engine misfire detection method may have any additional steps actualizing the additional functions of the engine misfire detection apparatus described above.

BEST MODES OF CARRYING OUT THE INVENTION

One mode of carrying out the invention is described below as a preferred embodiment with reference to the accompanied drawings.

Figure 1:
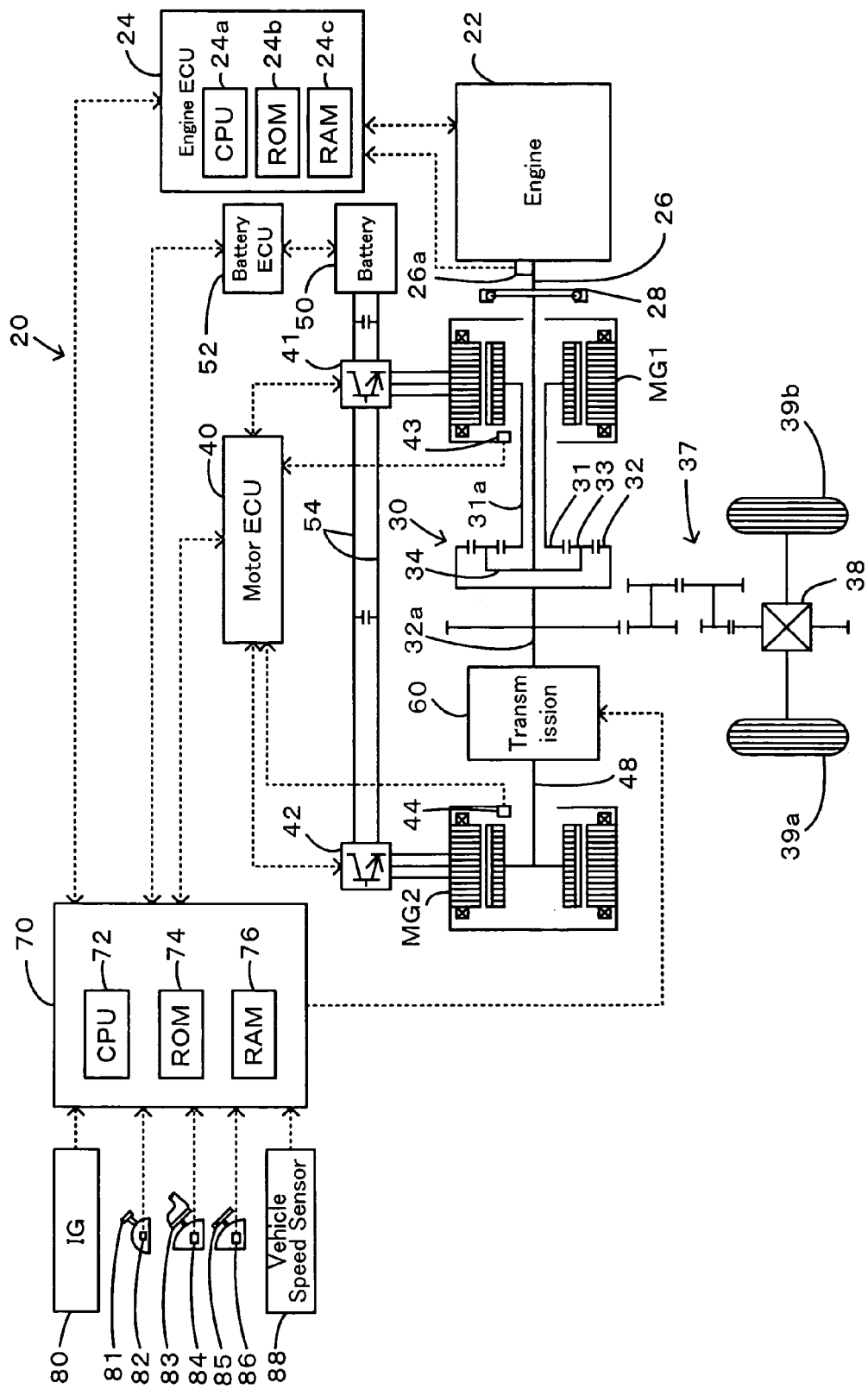
FIG. 1 schematically illustrates the configuration of a hybrid vehicle 20 in one embodiment of the invention.

FIG. 1 schematically illustrates the configuration of a hybrid vehicle 20 equipped with an engine misfire detection apparatus for internal combustion engine in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28 as a torsional element, a motor MG1 that is linked to the power distribution integration mechanism 30 and has power generation capability, a transmission 60 that is attached to a ring gear shaft 32a or a driveshaft connected to the power distribution integration mechanism 30, a motor MG2 that is linked with the transmission 60, and a hybrid electronic control unit 70 that controls the operations of the whole hybrid vehicle 20.

The engine 22 is a six-cylinder internal combustion engine that consumes a hydrocarbon fuel, such as gasoline or light oil, to output power. An engine electronic control unit (hereafter referred to as engine ECU) 24 inputs signals representing the operating conditions of the engine 22 from various sensors and performs operation control of the engine 22 including fuel injection control, ignition control, and intake air flow regulation. The engine ECU 24 is constructed as a microprocessor including a CPU 24a, a ROM 24b that stores processing programs, a RAM 24c that temporarily stores data, input and output ports (not shown), and a communication port (not shown). The engine ECU 24 inputs signals from various sensors that measure and detect the operating conditions of the engine 22, for example, a crank position from a crank position sensor 26a detected as the rotational position of the crankshaft 26. The engine ECU 24 communicates with the hybrid electronic control unit 70. The engine ECU 24 controls the operations of the engine 22 in response to control signals input from the hybrid electronic control unit 70, while outputting data regarding the operating conditions of the engine 22 to the hybrid electronic control unit 70 according to the requirements. The engine misfire detection apparatus for the internal combustion engine is mainly attained by the engine ECU 24 in this embodiment.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed to the sun gear 31 and to the ring gear 32 according to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. The operations of both the motors MG1 and MG2 are controlled by a motor electronic control unit (hereafter referred to as motor ECU) 40. The motor ECU 40 inputs signals required for controlling the operations of the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to control the operations of the motors MG1 and MG2 in response to control signals input from the hybrid electronic control unit 70 and to output data regarding the operating conditions of the motors MG1 and MG2 to the hybrid electronic control unit 70 according to the requirements.

Figure 2:
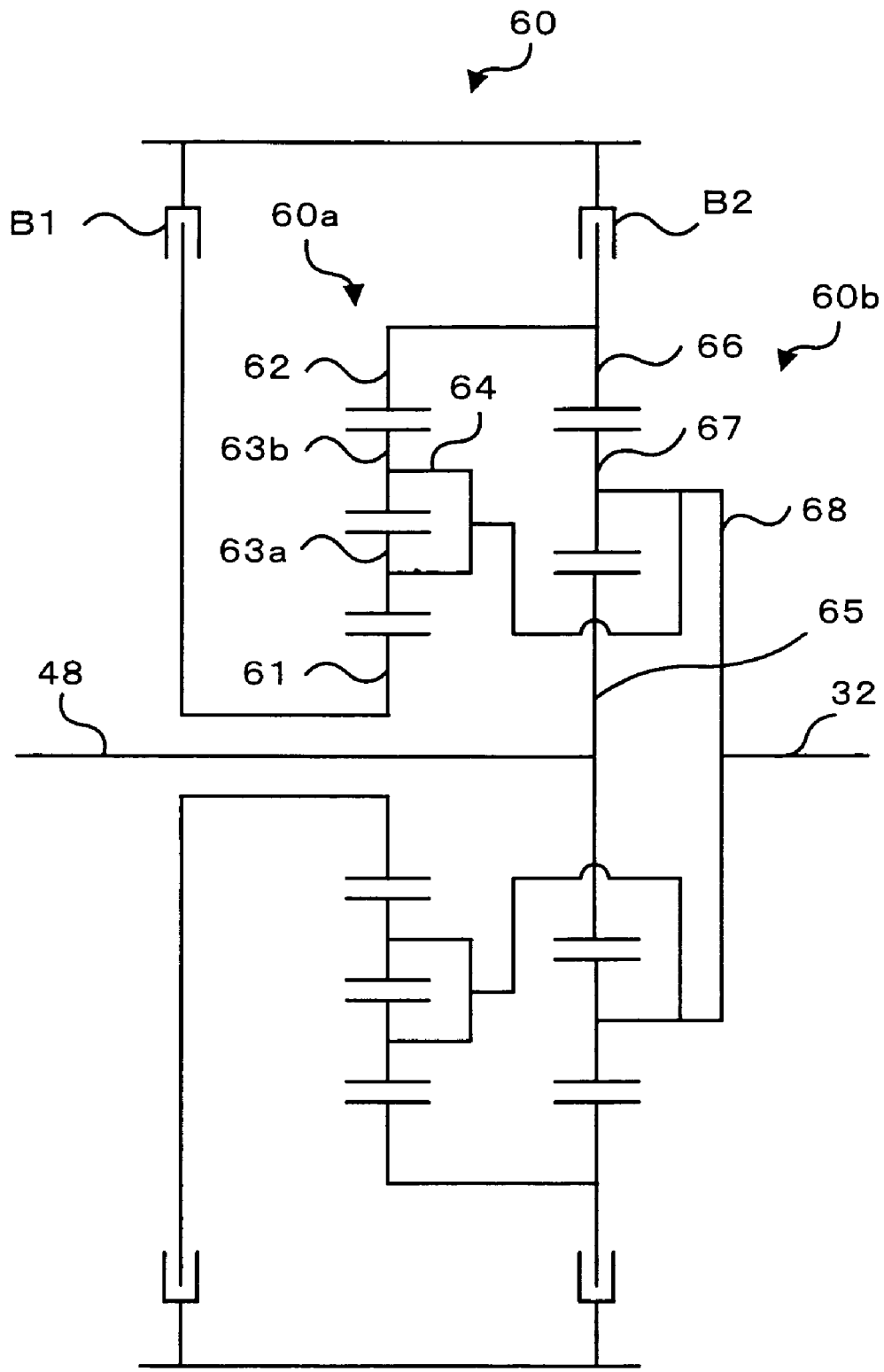
FIG. 2 schematically illustrates the structure of a transmission 60.

The transmission 60 functions to connect and disconnect a rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gear 63a engaging with the sun gear 61, multiple second pinion gears 63b engaging with the multiple first pinion gears 63a and with the ring gear 62, and a carrier 64 coupling the multiple first pinion gears 63a with the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 of the single-pinion planetary gear mechanism 60b are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively large reduction gear ratio and transmits the largely reduced rotation to the ring gear shaft 32a. This state is hereafter expressed as Lo gear position. The combination of the engaged brake B1 and the released brake B2 reduces the rotation of the rotating shaft 48 of the motor MG2 at a relatively small reduction gear ratio and transmits the slightly reduced rotation to the ring gear shaft 32a. This state is hereafter expressed as Hi gear position. The combination of the engaged brakes B1 and B2 prohibits the rotations of the rotating shaft 48 and the ring gear shaft 32a. In the structure of the embodiment, the brakes B1 and B2 are engaged and released by regulating hydraulic pressures applied to the brakes B1 and B2 with hydraulic actuators (not shown).

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature from a temperature sensor (not shown) attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor, for the purpose of management and control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 outputs, via its output port, driving signals to the actuators (not shown) to operate and control the brakes B1 and B2 included in the transmission 60. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment constructed as described above sets a torque demand to be output to the ring gear shaft 32a or the driveshaft, based on the vehicle speed V and the accelerator opening Acc corresponding to the driver's depression amount of the accelerator pedal 83. The engine 22 and the motors MG1 and MG2 are controlled to be driven at efficient drive points, in order to ensure output of a power demand equivalent to the preset torque demand to the ring gear shaft 32a. When the vehicle speed V exceeds a predetermined speed, for example, 60 km/h or 80 km/h, to require a Lo-to-Hi gear change, the hybrid electronic control unit 70 changes the brake conditions from the combination of the released brake. B1 and the engaged brake B2 to the combination of the engaged brake B1 and the released brake B2. When the vehicle speed V decreases to or below the predetermined speed to require a Hi-to-Lo gear change, on the other hand, the hybrid electronic control unit 70 changes the brake conditions from the combination of the engaged brake B1 and the released brake B2 to the combination of the released brake B1 and the engaged brake B2. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and, controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
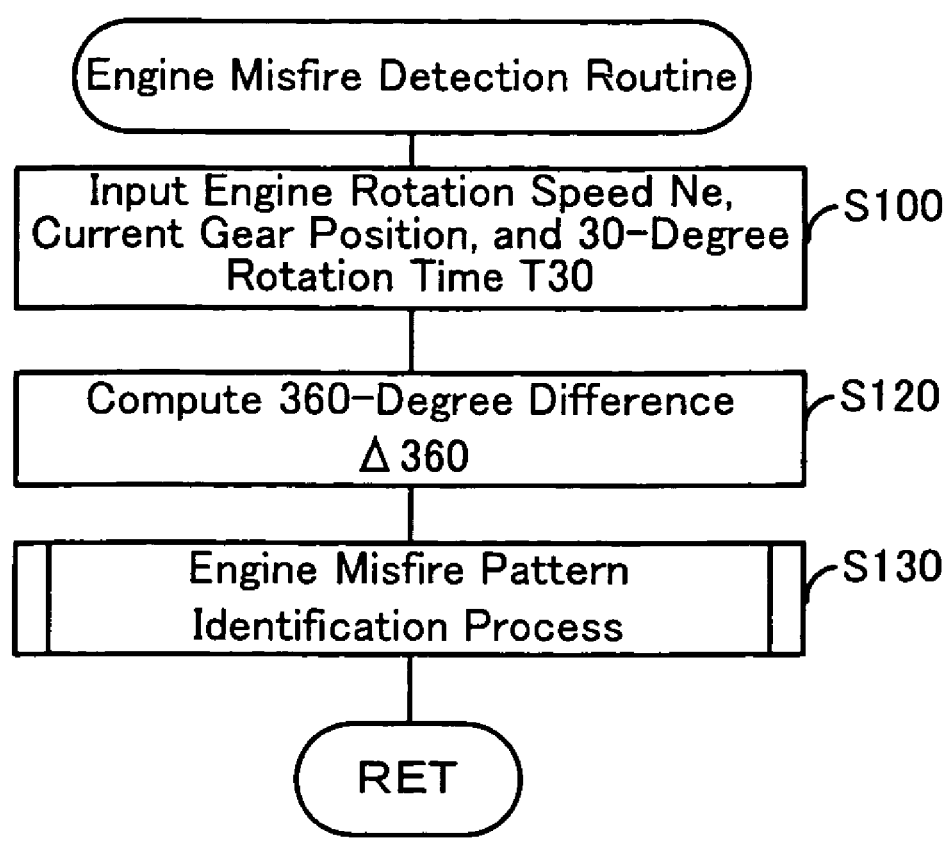
FIG. 3 is a flowchart showing an engine misfire detection routine executed by an engine ECU 24.

The description regards a series of operations to detect a misfire in any of the cylinders of the engine 22 mounted on the hybrid vehicle 20 of the embodiment constructed as described above. FIG. 3 is an engine misfire detection routine executed by the engine ECU 24. This engine misfire detection routine is performed repeatedly at preset time intervals.

In the engine misfire detection routine, the CPU 24a of the engine ECU 24 first inputs a 30-degree rotation time T30 computed as a time required for a 30-degree rotation of the crankshaft 26, an engine rotation speed Ne, and a current speed or gear position of the transmission 60 (step S100). The 30-degree rotation time T30 is computed by a T30 computation routine (not shown). The T30 computation routine successively inputs the time of each 30-degree rotation of a crank angle CA detected by the crank position sensor 26a and calculates a difference between the currently input time for a current 30-degree rotation of the crank angle CA and the previously input time for a previous 30-degree rotation of the crank angle CA to compute the 30-degree rotation time T30. The rotation speed Ne of the engine 22 is computed based on the signal output from the crank position sensor 26a attached to the crankshaft 26. The speed or gear position of the transmission 60 is identified based on the engagement-release conditions of the brakes B1 and B2 detected by sensors provided for the brakes B1 and B2 and is input from the hybrid electronic control unit 70 by communication.

The CPU 24a subsequently computes a 360-degree difference Δ360 of the input 30-degree rotation time T30 (step S110). The 360-degree difference Δ360 of the 30-degree rotation time T30 is given as a difference between the currently input 30-degree rotation time T30 and a previous 30-degree rotation time T30 input 360 degrees before. In the six-cylinder engine, explosive combustion of the air-fuel mixture takes place at the crank angle CA of every 120 degrees. The 360-degree difference Δ360 between a large 30-degree rotation time T30 for a misfired cylinder and a small 30-degree rotation time T30 for a non-misfired cylinder is greater than the 360-degree difference Δ360 between 30-degree rotation times T30 for two non-misfired cylinders. A peak of the 360-degree difference Δ360 thus substantially corresponds to a misfired cylinder (see FIG. 6 described later). After computation of the 360-degree difference Δ360, the CPU 24a performs an engine misfire pattern identification process for identifying a misfire pattern of the engine 22 (step S120) and terminates this engine misfire detection routine. The engine misfire pattern identification process of this embodiment includes a single misfire identification process for identifying a single misfire pattern with only one misfired cylinder among the multiple cylinders of the engine 22 and a consecutive misfire identification process for identifying a consecutive misfire pattern with two consecutive misfired cylinders among the multiple cylinders of the engine 22, as described below in detail.

Figure 4:
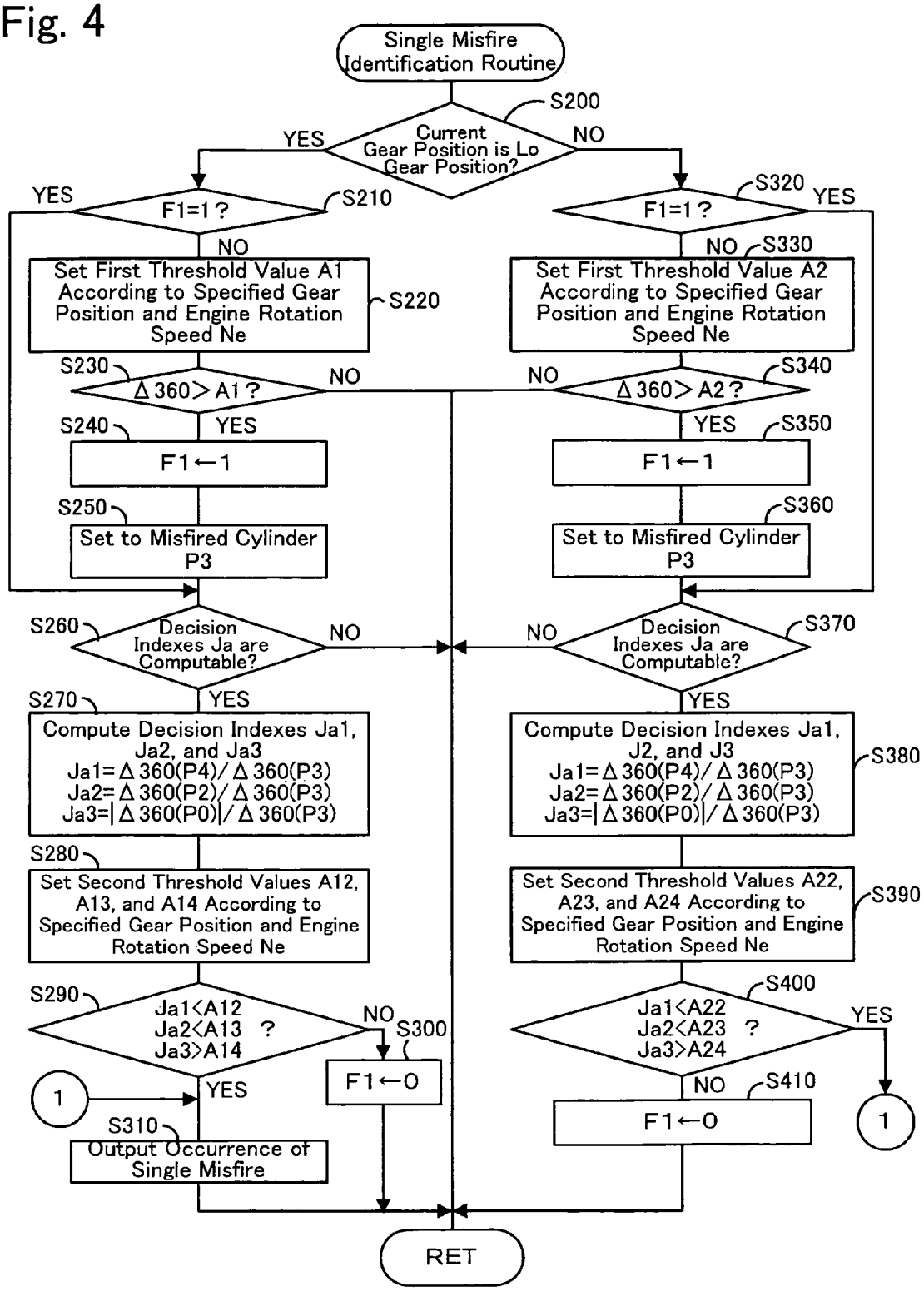
FIG. 4 is a flowchart showing a single misfire identification routine.

The description first regards the single misfire identification process for identifying the single misfire pattern. FIG. 4 is a flowchart showing a single misfire identification routine executed by the CPU 24a of the engine ECU 24. The single misfire identification routine first compares the 360-degree difference Δ360 with a preset first threshold value to make a tentative decision on the occurrence of a single misfire in the engine 22. The single misfire identification routine then uses a preset second threshold value to determine whether the behavior of the 360-degree difference Δ360 matches a characteristic behavior of a single misfire and makes a final decision to finally identify the occurrence of a single misfire in the engine 22 based on the result of the determination. In the single misfire identification routine, the CPU 24a first specifies whether the current gear position of the transmission 60 is the Lo gear position, based on the data input at step S100 in the engine misfire detection routine (step S200). The current gear position of the transmission 60 may be a transient state of gear change from the Lo gear position to the Hi gear position or from the Hi gear position to the Lo gear position. Based on some experimental results, the procedure of the embodiment specifies the transient state of gear change of the transmission 60 from the Lo gear position to the Hi gear position as the Lo gear position, while specifying the transient state of gear change of the transmission 60 from the Hi gear position to the Lo gear position as the Hi gear position. When the current gear position of the transmission 60 is specified as the Lo gear position, the CPU 24a identifies whether a single misfire tentative decision flag F1 is equal to 1 (step S210). The single misfire tentative decision flag F1 is set to 0 at the initial state and is set to 1 in the event of a tentative decision on the occurrence of a single misfire.

Figure 5:
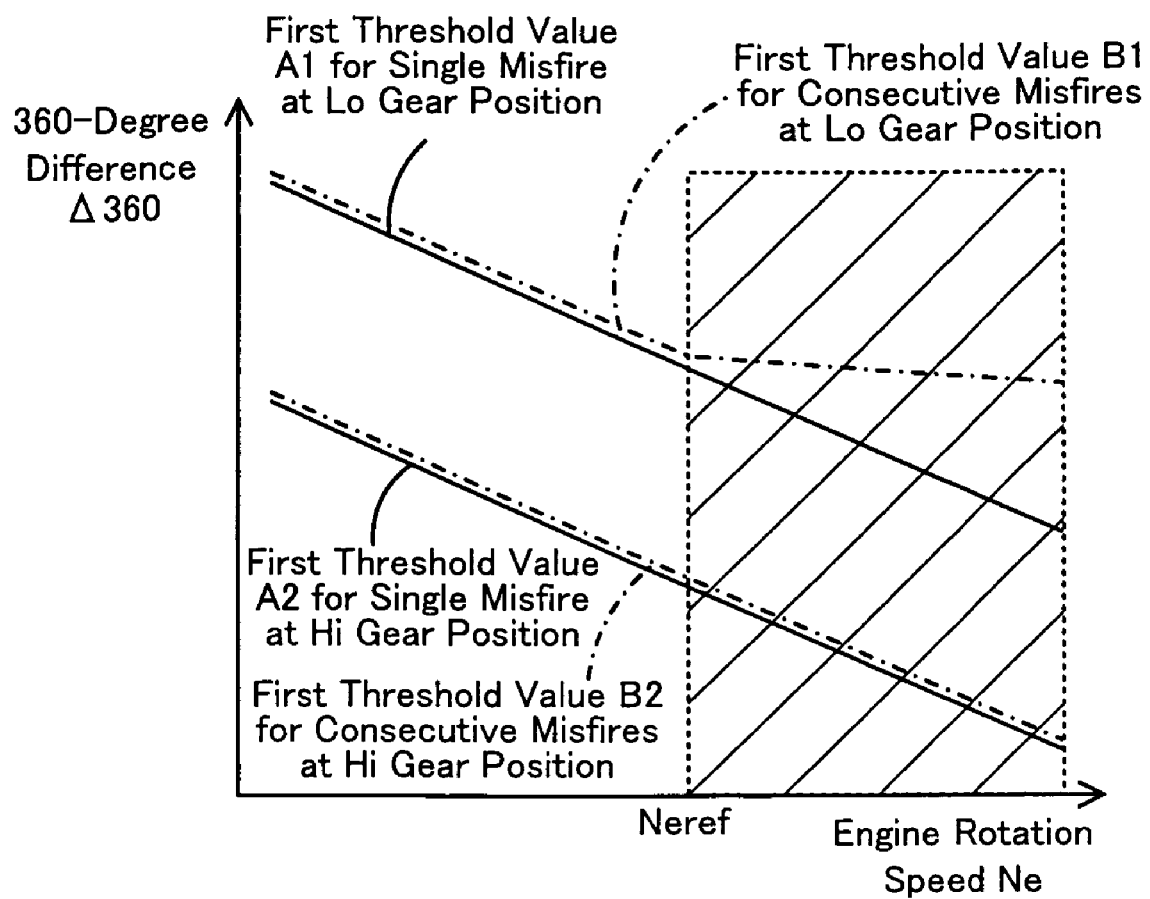
FIG. 5 shows one example of a first threshold value setting map representing variations of first threshold values against the engine rotation speed Ne and the current gear position.

When the single misfire tentative decision flag F1 is not equal to 1 but is equal to 0, a first threshold value A1 for a tentative decision on a single misfire in the engine 22 at the Lo gear position is, set according to the engine rotation speed Ne and the specified gear position of the transmission 60 (step S220). The procedure of setting the first threshold value A1 in this embodiment experimentally or otherwise determines the value of the 360-degree difference Δ360 in the single misfire state of the engine 22 corresponding to the engine rotation speed Ne at the Lo gear position of the transmission 60. The procedure refers to this experimental result and specifies and stores a variation in first threshold value A1 ensuring highly accurate detection of the single misfire state of the engine 22 against the rotation speed Ne of the engine 22 as a first threshold value setting map in the ROM 24b. The procedure reads the first threshold value A1 corresponding to the given gear position of the transmission 60 (the Lo gear position in this flow) and the given engine rotation speed Ne from the first threshold value setting map. FIG. 5 shows one example of the first threshold value setting map representing variations of first threshold values against the engine rotation speed Ne and the current gear position. The first threshold value setting map of FIG. 5 includes a variation in first threshold value A2 for a tentative decision on a single misfire in the engine 22 at the Hi gear position of the transmission 60, a variation in first threshold value B1 for a tentative decision on consecutive misfires in the engine 22 at the Lo gear position of the transmission 60, and a variation in first threshold value B2 for a tentative decision on consecutive misfires in the engine 22 at the Hi gear position of the transmission 60, as well as the variation in first threshold value A1 for a tentative decision on a single misfire in the engine 22 at the Lo gear position of the transmission 60. The first threshold values B1 and B2 will be described later. The first threshold value A1 for the tentative decision on a single misfire at the Lo gear position and the first threshold value A2 for the tentative decision on a single misfire at the Hi gear position are empirically determined to decrease with an increase in engine rotation speed Ne. The first threshold value A2 at the Hi gear position of the transmission 60 is empirically determined to be smaller than the first threshold value A1 at the Lo gear position of the transmission 60. Namely the smaller first threshold value is given at the higher gear position.

Figure 6:
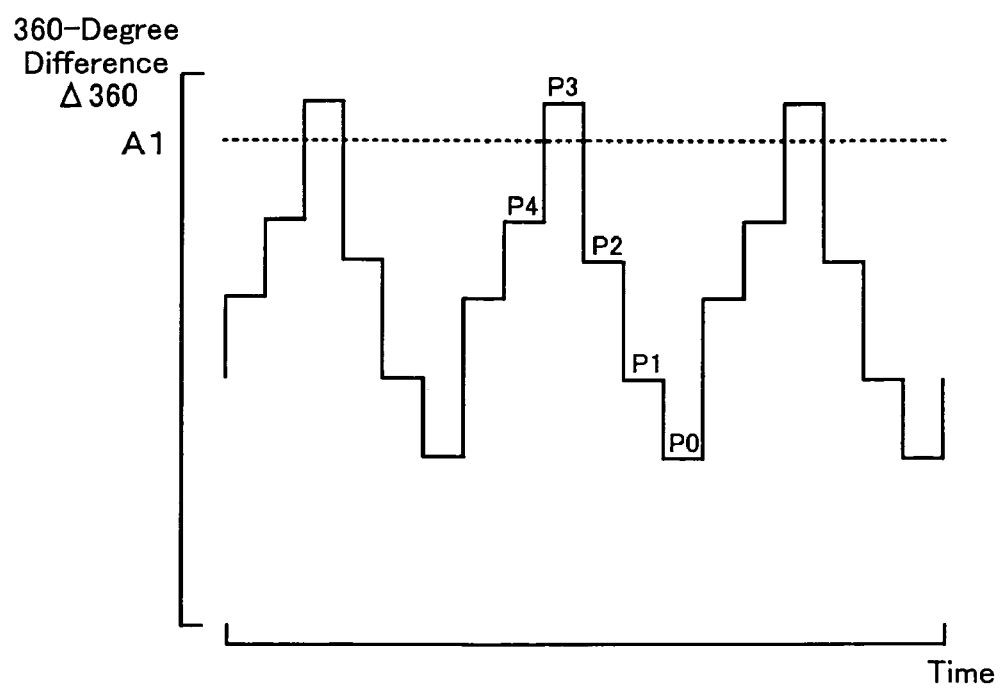
FIG. 6 is a chart showing a variation in 360-degree difference Δ360 in a single misfire state at a Lo gear position of the transmission 60.

After setting the first threshold value A1, the CPU 24a determines whether the 360-degree difference Δ360 exceeds the first threshold value A1 (step S230). When the 360-degree difference Δ360 does not exceed the first threshold value A1, a target cylinder of the single misfire identification is identified as no single-misfired cylinder. The CPU 24a thus immediately terminates this single misfire identification routine. When the 360-degree difference Δ360 exceeds the first threshold value A1, on the other hand, there is a possibility that the target cylinder of the single misfire identification is a single-misfired cylinder. In this case, the CPU 24a makes a tentative decision on the occurrence of a single misfire in the target cylinder and sets the value '1' to the single misfire tentative decision flag F1 (step S240). The target cylinder is then set to a misfired cylinder P3 (step S250). Here 'P3' represents a symbol of convenience given to a misfired cylinder for easy discrimination of the 360-degree differences Δ360 of the misfired cylinder and cylinders explosively combusted before and after the misfired cylinder in a subsequent final decision of a single misfire described later. FIG. 6 is a chart showing a variation in 360-degree difference Δ360 in the single misfire state at the Lo gear position of the transmission 60. In the chart of FIG. 6, a cylinder having the 360-degree difference Δ360 exceeding the first threshold value A1 is specified as the misfired cylinder P3. A cylinder explosively combusted immediately before the misfired cylinder P3 is shown as a pre-misfire cylinder P4. Cylinders explosively combusted immediately, second, and third after the misfired cylinder P3 are respectively shown as post-misfire cylinders P2, P1, and P0.

After setting the misfired cylinder P3, the CPU 24a determines whether decision indexes Ja1, Ja2, and Ja3 used for the final decision of a single misfire are computable (step S260). The final decision of a single misfire uses the decision indexes computed from the 360-degree differences Δ360 of the post-misfire cylinders explosively combusted after the misfired cylinder P3. Namely the final decision can not be made immediately after the tentative decision. The processing of step S260 determines whether the final decision is allowable after the tentative decision of a single misfire. When the decision indexes Ja1, Ja2, and Ja3 are not computable, the CPU 24a terminates the single misfire identification routine. In the course of repetition of this single misfire identification routine with identification of the single misfire tentative decision flag F1 as 1 at step S210, the decision indexes Ja1, Ja2, and Ja3 are determined as computable at step S260. In response to the computable determination, the decision indexes Ja1, Ja2, and Ja3 are actually computed (step S270). The decision index Ja1 represents a ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3. The decision index Ja2 represents a ratio Δ360(P2)/Δ360(P3) of the 360-degree difference Δ360(P2) of the post-misfire cylinder P2 explosively-combusted immediately after the misfired cylinder P3 to the 360-degree difference Δ360(P3) of the misfired cylinder P3. The decision index Ja3 represents a ratio |Δ360(P0)|/Δ360(P3) of the absolute value of the 360-degree difference Δ360(P0) of the post-misfire cylinder P0 explosively combusted third after the misfired cylinder P3 to the 360-degree difference Δ360(P3) of the misfired cylinder P3.

Second threshold values A12, A13, and A14 to be referred to for the final decision of a single misfire at the Lo gear position are then set according to the specified gear position and the engine rotation speed Ne (step S280). The second threshold value A12 represents an upper limit in a varying range of the ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3 in the single misfire state at the Lo gear position. The second threshold value A13 represents an upper limit in a varying range of the ratio Δ360(P2)/Δ360(P3) of the 360-degree difference Δ360(P2) of the post-misfire cylinder P2 explosively combusted immediately after the misfired cylinder P3 to the 360-degree difference Δ360(P3) of the misfired cylinder P3 in the single misfire state at the Lo gear position. The second threshold value A14 represents a lower limit in a varying range of the ratio |Δ360(P0)|/Δ360(P3) of the absolute value of the 360-degree difference Δ360(P0) of the post-misfire cylinder P0 explosively combusted third after the misfired cylinder P3 to the 360-degree difference Δ360(P3) of the misfired cylinder P3 in the single misfire state at the Lo gear position. The procedure of setting the second threshold values A12, A13, and A14 in this embodiment stores experimentally or otherwise specified variations of these second threshold values A12, A13, and A14 against the engine rotation speed Ne and the gear position (the Lo gear position in this flow) as a map in the ROM 24b and reads the second threshold values A12, A13, and A14 corresponding to the given gear position and the given engine rotation speed Ne from the map in the ROM 24b.

After setting the second threshold values A12, A13, and A14 according to the specified gear position and the engine rotation speed Ne, the CPU 24a determines whether the computed decision indexes Ja1, Ja2, and Ja3 are respectively in the ranges defined by the second threshold values A12, A13, and A14 (step S290). The determination result of step S290 identifies whether the tentatively judged misfire is a single misfire at the Lo gear position of the transmission 60. When any of the computed decision indexes Ja1, Ja2, and Ja3 are not in the ranges defined by the second threshold values A12, A13, and A14, it is determined that the tentatively judged misfire is not a single misfire. The CPU 24a then sets 0 to the single misfire tentative decision flag F1 (step S300) and terminates the single misfire, identification routine. When all of the computed decision indexes Ja1, Ja2, and Ja3 are in the ranges defined by the second threshold values A12, A13, and A14, the final decision is made to determine that the tentatively judged misfire is a single misfire. The CPU 24a then outputs the occurrence of a single misfire (step S310) and terminates the single misfire identification routine.

When the current gear position of the transmission 60 is specified not as the Lo gear position but as the Hi gear position at step S200, on the other hand, the CPU 24a identifies whether the single misfire tentative decision flag F1 is equal to 1 (step S320). When the single misfire tentative decision flag F1 is not equal to 1 but is equal to 0, the first threshold value A2 for a tentative decision on a single misfire in the engine 22 at the Hi gear position is set according to the engine rotation speed Ne and the specified gear position of the transmission 60 (step S330). Like the first threshold value A1 explained above, the procedure of setting the first threshold value A2 in this embodiment stores an empirically or otherwise specified variation in first threshold value A2 ensuring highly accurate detection of the single misfire state of the engine 22 at the Hi gear position of the transmission 60 against the engine rotation speed Ne as the first threshold value setting map of FIG. 5 in the ROM 24b. The procedure reads the first threshold value A2 corresponding to the given gear position of the transmission 60 (the Hi gear position in this flow) and the given engine rotation speed Ne from the first threshold value setting map. As mentioned previously, the first threshold value A2 is set to be smaller than the first threshold value A1. The threshold values used for detection of a single misfire are changed according to the gear position of the transmission 60, because of the following reason. The gear ratio of the rotating shaft 48 of the motor MG2 to the ring gear shaft 32a of the power distribution integration mechanism 30 linked with the crankshaft 26 of the engine 22 is varied according to the gear position of the transmission 60. The changed gear position may thus vary the effects of the operating conditions of the transmission 60 and the power distribution integration mechanism 30 on the crankshaft 26 of the engine 22 via the damper 28.

Figure 7:
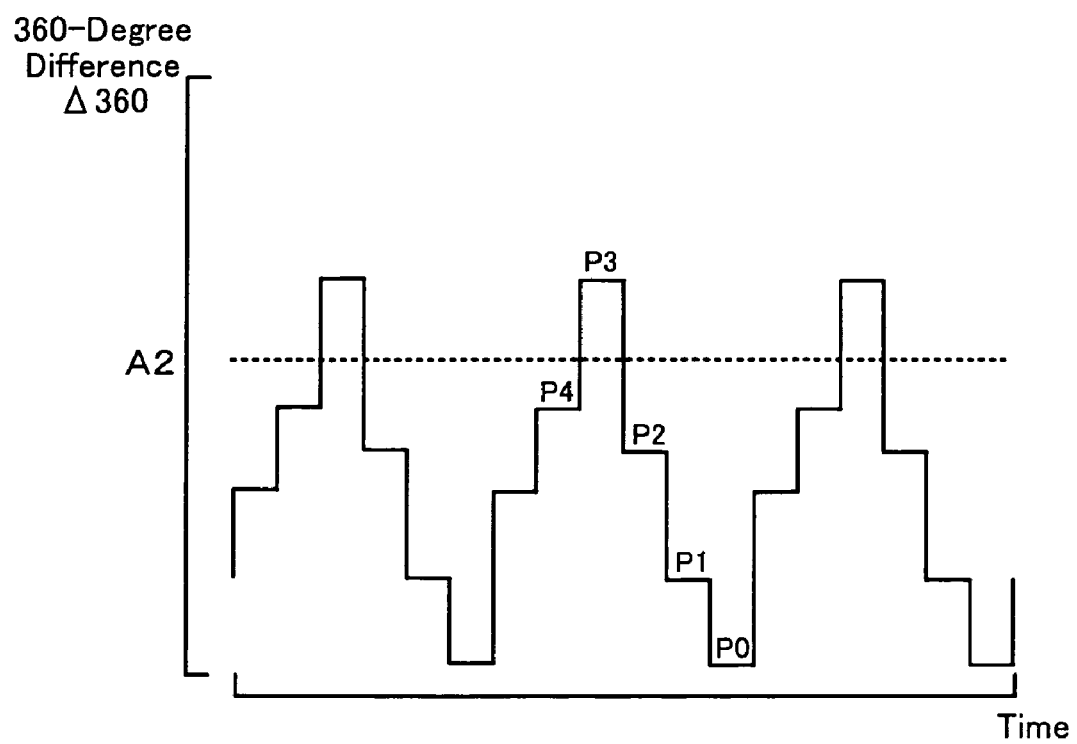
FIG. 7 is a chart showing a variation in 360-degree difference Δ360 in the single misfire state at a Hi gear position of the transmission 60.

After setting the first threshold value A2, the CPU 24a determines whether the 360-degree difference Δ360 exceeds the first threshold value A2 (step S340). When the 360-degree difference Δ360 does not exceed the first threshold value A2, the target cylinder of the single misfire identification is identified as no single-misfired cylinder. The CPU 24a thus immediately terminates this single misfire identification routine. When the 360-degree difference Δ360 exceeds the first threshold value A2, on the other hand, there is a possibility that the target cylinder of the single misfire identification is a single-misfired cylinder. In this case, the CPU 24a makes a tentative decision on the occurrence of a single misfire in the target cylinder and sets the value '1' to the single misfire tentative decision flag F1 (step S350). The target cylinder is then set to a misfired cylinder P3 (step S360). FIG. 7 is a chart showing a variation in 360-degree difference Δ360 in the single misfire state at the Hi gear position of the transmission 60. In the chart of FIG. 7, a cylinder having the 360-degree difference Δ360 exceeding the first threshold value A2 is specified as the misfired cylinder P3. A cylinder explosively combusted immediately before the misfired cylinder P3 is shown as a pre-misfire cylinder P4. Cylinders explosively combusted immediately, second, and third after the misfired cylinder P3 are respectively shown as post-misfire cylinders P2, P1, and P0.

After setting the misfired cylinder P3, the CPU 24a determines whether the decision indexes Ja1, Ja2, and Ja3 used for the final decision of a single misfire are computable (step S370) in the same manner as step S260 described above. When the decision indexes Ja1, Ja2, and Ja3 are not computable, the CPU 24a terminates the single misfire identification routine. In the course of repetition of this single misfire identification routine with identification of the single misfire tentative decision flag F1 as 1 at step S320, the decision indexes Ja1, Ja2, and Ja3 are determined as computable at step S370. In response to the computable determination, the decision indexes Ja1, Ja2, and Ja3 are actually computed (step S380) in the same manner as step S270 described above.

Second threshold values A22, A23, and A24 to be referred to for the final decision of a single misfire at the Hi gear position are then set according to the specified gear position and the engine rotation speed Ne (step S390). The second threshold value A22 represents an upper limit in a varying range of the ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3 in the single misfire state at the Hi gear position. The second threshold value A23 represents an upper limit in a varying range of the ratio Δ360(P2)/Δ360(P3) of the 360-degree difference Δ360(P2) of the post-misfire cylinder P2 explosively combusted immediately after the misfired cylinder P3 to the 360-degree difference Δ360(P3) of the misfired cylinder P3 in the single misfire state at the Hi gear position. The second threshold value A24 represents a lower limit in a varying range of the ratio |Δ360(P0)|/Δ360(P3) of the absolute value of the 360-degree difference Δ360(P0) of the post-misfire cylinder P0 explosively combusted third after the misfired cylinder P3 to the 360-degree difference Δ360(P3) of the misfired cylinder P3 in the single misfire state at the Hi gear position. The second threshold values A22, A23, and A24 at the Hi gear position are set to be respectively smaller than the corresponding second threshold values A12, A13, and A14 at the Lo gear position. The procedure of setting the second threshold values A22, A23, and A24 in this embodiment stores experimentally or otherwise specified variations of these second threshold values A22, A23, and A24 against the engine rotation speed Ne and the gear position (the Hi gear position in this flow) as a map in the ROM 24b and reads the second threshold values A22, A23, and A24 corresponding to the given gear position and the given engine rotation speed Ne from the map in the ROM 24b.

After setting the second threshold values A22, A23, and A24 according to the specified gear position and the engine rotation speed Ne, the CPU 24a determines whether the computed decision indexes Ja1, Ja2, and Ja3 are respectively in the ranges defined by the second threshold values A22, A23, and A24 (step S400). The determination result of step S400 identifies whether the tentatively judged misfire is a single misfire at the Hi gear position of the transmission 60. When any of the computed decision indexes Ja1, Ja2, and Ja3 are not in the ranges defined by the second threshold values A22, A23, and A24, it is determined that the tentatively judged misfire is not a single misfire. The CPU 24a then sets 0 to the single misfire tentative decision flag F1 (step S410) and terminates the single misfire identification routine. When all of the computed decision indexes Ja1, Ja2, and Ja3 are in the ranges defined by the second threshold values A22, A23, and A24, the final decision is made to determine that the tentatively judged misfire is a single misfire. The CPU 24a then outputs the occurrence of a single misfire (step S310) and terminates the single misfire identification routine.

Figure 8:
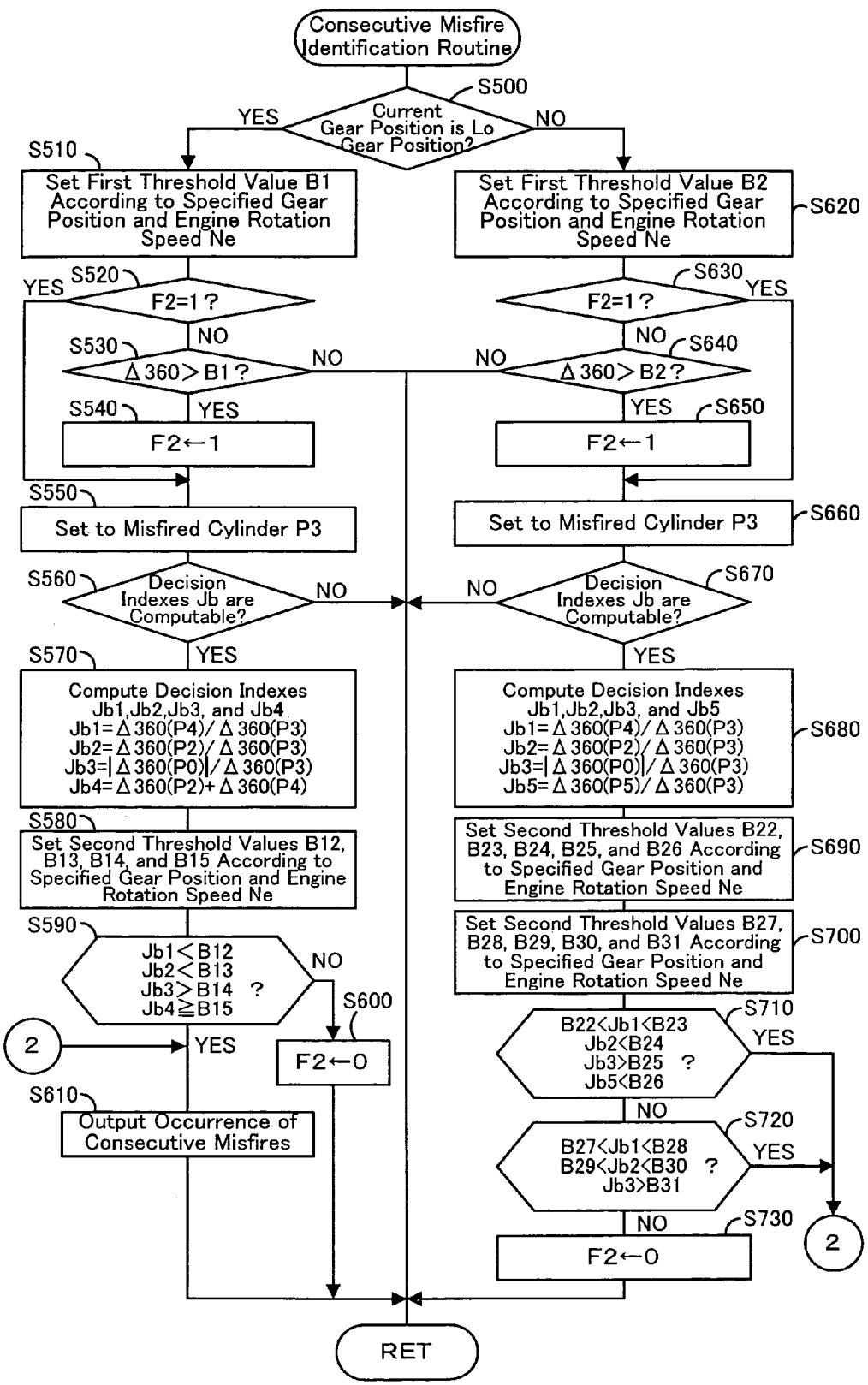
FIG. 8 is a flowchart showing a consecutive misfire identification routine.

The description regards the consecutive misfire identification process for identifying the consecutive misfire pattern. FIG. 8 is a flowchart showing a consecutive misfire identification routine executed by the CPU 24a of the engine ECU 24. In the similar manner to the single misfire identification routine described above, the consecutive misfire identification routine makes a tentative decision and a final decision to identify the occurrence of consecutive misfires in the engine 22. In the consecutive misfire identification routine, the CPU 24a first specifies whether the current gear position of the transmission 60 is the Lo gear position, based on the data input at step S100 in the engine misfire detection routine (step S500). As in the single misfire identification routine described above, the procedure of the embodiment specifies the transient state of gear change of the transmission 60 from the Lo gear position to the Hi gear position as the Lo gear position, while specifying the transient state of gear change of the transmission 60 from the Hi gear position to the Lo gear position as the Hi gear position. When the current gear position of the transmission 60 is specified as the Lo gear position, the first threshold value B1 for a tentative decision on consecutive misfires in the engine 22 at the Low gear position is set according to the engine rotation speed Ne and the specified gear position of the transmission 60 (step S510). The procedure of setting the first threshold value B1 in this embodiment experimentally or otherwise determines the value of the 360-degree difference Δ360 in the consecutive misfire state of the engine 22 corresponding to the engine rotation speed Ne at the Lo gear position of the transmission 60. The procedure refers to this experimental result and specifies and stores a variation in first threshold value B1 ensuring highly accurate detection of the consecutive misfire state of the engine 22 against the rotation speed Ne of the engine 22 as a first threshold value setting map in the ROM 24b. The procedure reads the first threshold value B1 corresponding to the given gear position of the transmission 60 (the Lo gear position in this flow) and the given engine rotation speed Ne from the first threshold value setting map. As shown in FIG. 5, the first threshold value B1 for the tentative decision on consecutive misfires at the Lo gear position and the first threshold value B2 for the tentative decision on consecutive misfires at the Hi gear position are empirically determined to decrease with an increase in engine rotation speed Ne. The first threshold value B2 at the Hi gear position of the transmission 60 is empirically determined to be smaller than the first threshold value B1 at the Lo gear position of the transmission 60. Namely the smaller first threshold value is given at the higher gear position. The first threshold value A1 for the tentative decision on a single misfire at the Lo gear position and the first threshold value B1 for the tentative decision on consecutive misfires at the Lo gear position have identical values in an engine rotation speed range of not higher than a preset rotation speed Neref. In an engine rotation speed range of higher than the preset rotation speed Neref, the first threshold value B1 is set to be greater than the first threshold value A1. Different values are set to the first threshold value A1 and the first threshold value B1 for engine misfire identification in the engine rotation speed range of higher than the preset rotation speed Neref, because of the following reason. There is generally a greater effect of resonance by the damper 28 as the torsional element on the crankshaft 26 in the consecutive misfires state at the Lo gear position, compared with those in the single misfire state at the Lo gear position and in the consecutive misfire state at the Hi gear position.

The first threshold value A2 for the tentative decision on a single misfire at the Hi gear position and the first threshold value B2 for the tentative decision on consecutive misfires at the Hi gear position have identical values over the whole range of the engine rotation speed Ne.

Figure 9:
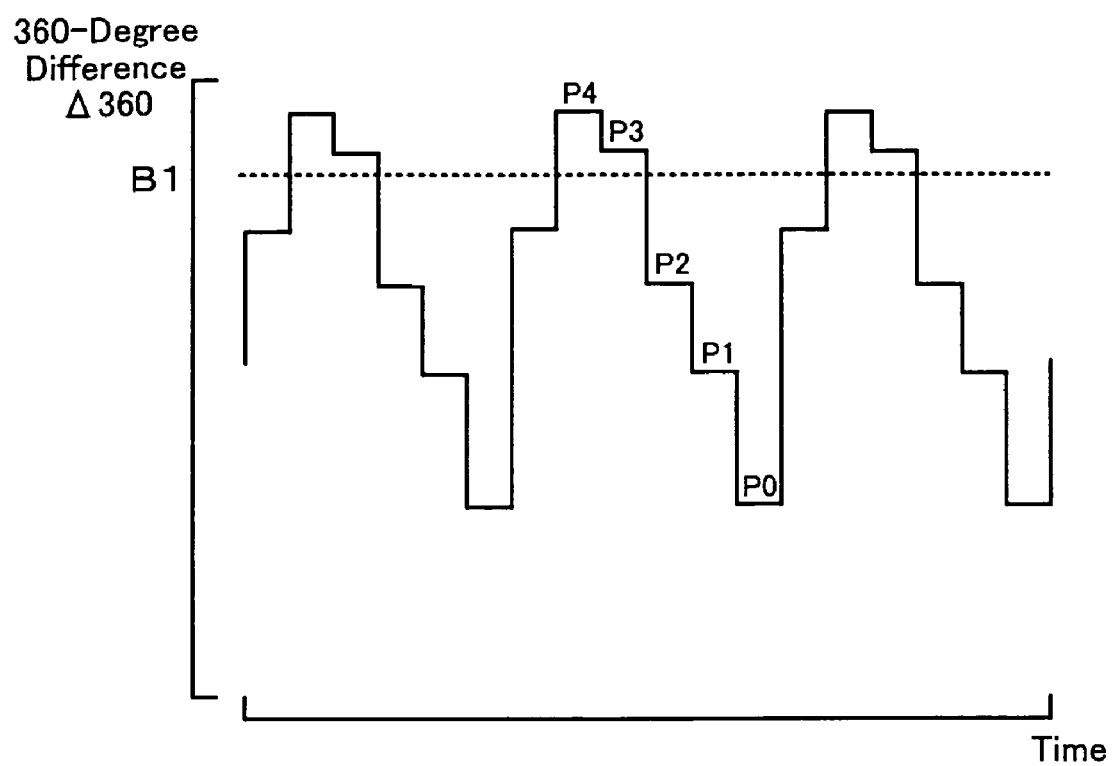
FIG. 9 is a chart showing a variation in 360-degree difference Δ360 in a consecutive misfire state at the Lo gear position of the transmission 60.

After setting the first threshold value B1, the CPU 24a identifies whether a consecutive misfire tentative decision flag F2 is equal to 1 (step S520). The consecutive misfire tentative decision flag F2 is set to 0 at the initial state and is set to 1 in the event of a tentative decision on the occurrence of consecutive misfires. When the consecutive misfire tentative decision flag F2 is not equal to 1 but is equal to 0, the CPU 24a determines whether the 360-degree difference Δ360 exceeds the first threshold value B1 (step S530). When the 360-degree difference Δ360 does not exceed the first threshold value B1, a target cylinder of the consecutive misfire identification is identified as no consecutively-misfired cylinder. The CPU 24a thus immediately terminates this consecutive misfire identification routine. When the 360-degree difference Δ360 exceeds the first threshold value B1, on the other hand, there is a possibility that the target cylinder of the consecutive misfire identification is a consecutively-misfired cylinder. In this case, the CPU 24a makes a tentative decision on the occurrence of a consecutive misfire in the target cylinder and sets the value '1' to the consecutive misfire tentative decision flag F2 (step S540). The CPU 24a then performs a setting process of a misfired cylinder P3 (step S550). In the consecutive misfire identification routine of this embodiment, in response to detection of a no-exceeding cylinder having the 360-degree difference Δ360 not exceeding the first threshold value B1 (a cylinder P2 in FIG. 9) after detection of at least one exceeding cylinder having the 360-degree difference Δ360 exceeding the first threshold value B1, a cylinder immediately before the detected no-exceeding cylinder is set to the misfired cylinder P3 at step S550. The consecutive misfire identification routine proceeds to a next step after setting the misfired cylinder P3. FIG. 9 is a chart showing a variation in 360-degree difference Δ360 in the consecutive misfire state at the Lo gear position of the transmission 60. In the chart of FIG. 9, a last cylinder having the 360-degree difference Δ360 exceeding the first threshold value B1 is specified as the misfired cylinder. P3. A cylinder explosively combusted immediately before the misfired cylinder P3 is shown as a pre-misfire cylinder P4. Cylinders explosively combusted immediately, second, and third after the misfired cylinder P3 are respectively shown as post-misfire cylinders P2, P1, and P0.

After the setting process of the misfired cylinder P3, the CPU 24a determines whether decision indexes Jb1, Jb2, Jb3, and Jb4 used for the final decision of consecutive misfires are computable (step S560). The processing of step S560 determines whether the final decision is allowable after the tentative decision of consecutive misfires, as in the similar manner to the processing of step S260 in the single misfire identification routine. When the decision indexes Jb1, Jb2, Jb3, and Jb4 are not computable, the CPU 24a terminates the consecutive misfire identification routine. In the course of repetition of this consecutive misfire identification routine with setting of the first threshold value B1 at step S510 and identification of the consecutive misfire tentative decision flag F2 as 1 at step S520, the decision indexes Jb1, Jb2, Jb3, and Jb4 are determined as computable at step S560. In response to the computable determination, the decision indexes Jb1, Jb2, Jb3, and Jb4 are actually computed (step S570). The decision index Jb1 represents a ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3. The decision index Jb2 represents a ratio Δ360(P2)/Δ360(P3) of the 360-degree difference Δ360(P2) of the post-misfire cylinder P2 explosively combusted immediately after the misfired cylinder P3 to the 360-degree difference Δ360(P3) of the misfired cylinder P3. The decision index Jb3 represents a ratio |Δ360(P0)|/Δ360(P3) of the absolute value of the 360-degree difference Δ360(P0) of the post-misfire cylinder P0 explosively combusted third after the misfired cylinder P3 to the 360-degree difference Δ360(P3) of the misfired cylinder P3. The decision index Jb4 represents a sum Δ360(P2)+Δ360(P4) of the 360-degree difference Δ360(P2) of the post-misfire cylinder P2 explosively combusted immediately after the misfired cylinder P3 and the 360-degree difference Δ360(P4) of the pre-misfire cylinder P4 explosively combusted immediately before the misfired cylinder P3.

Second threshold values B12, B13, B14, and B15 to be referred to for the final decision of consecutive misfires at the Lo gear position are then set according to the specified gear position and the engine rotation speed Ne (step S580). The second threshold value B12 represents an upper limit in a varying range of the ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3 in the consecutive misfire state at the Lo gear position. The second threshold value B13 represents an upper limit in a varying range of the ratio Δ360(P2)/Δ360(P3) of the 360-degree difference Δ360(P2) of the post-misfire cylinder P2 explosively combusted immediately after the misfired cylinder P3 to the 360-degree difference Δ360(P3) of the misfired cylinder P3 in the consecutive misfire state at the Lo gear position. The second threshold value B14 represents a lower limit in a varying range of the ratio |Δ360(P0)|/Δ360(P3) of the absolute value of the 360-degree difference Δ360(P0) of the post-misfire cylinder P0 explosively combusted third after the misfired cylinder P3 to the 360-degree difference $\Delta 360$ (P3) of the misfired cylinder P3 in the consecutive misfire state at the Lo gear position. The second threshold value B15 represents an upper limit in a varying range of the sum $\Delta 360$ (P2)+$\Delta 360$(P4) of the 360-degree difference $\Delta 360$(P2) of the post-misfire cylinder P2 explosively combusted immediately after the misfired cylinder P3 and the 360-degree difference $\Delta 360$(P4) of the pre-misfire cylinder P4 explosively combusted immediately before the misfired cylinder P3 in the consecutive misfire state at the Lo gear position. The procedure of setting the second threshold values B12, B13, B14, and B15 in this embodiment stores experimentally or otherwise specified variations of these second threshold values B12, B13, B14, and B15 against the engine rotation speed Ne and the gear position (the Lo gear position in this flow) as a map in the ROM 24$b$ and reads the second threshold values B12, B13, B14, and B15 corresponding to the given gear position and the given engine rotation speed Ne from the map in the ROM 24$b$.

After setting the second threshold values B12, B13, B14, and B15 according to the specified gear position and the engine rotation speed Ne, the CPU 24$a$ determines whether the computed decision indexes Jb1, Jb2, Jb3, and Jb4 are respectively in the ranges defined by the second threshold values B12, B13, B14, and B15 (step S590). The determination result of step S590 identifies whether the tentatively judged misfire is consecutive misfires at the Lo gear position of the transmission 60. When any of the computed decision indexes Jb1, Jb2, Jb3, and Jb4 are not in the ranges defined by the second threshold values B12, B13, B14, and B15, it is determined that the tentatively judged misfire is not consecutive misfires. The CPU 24$a$ then sets 0 to the consecutive misfire tentative decision flag F2 (step S600) and terminates the consecutive misfire identification routine. When all of the computed decision indexes Jb1, Jb2, Jb3, and Jb4 are in the ranges defined by the second threshold values B12, B13, B14, and B15, the final decision is made to determine that the tentatively judged misfire is consecutive misfires. The CPU 24$a$ then outputs the occurrence of consecutive misfires (step S610) and terminates the consecutive misfire identification routine.

When the current gear position of the transmission 60 is specified not as the Lo gear position but as the Hi gear position at step S500, on the other hand, the first threshold value B2 for a tentative decision on consecutive misfires in the engine 22 at the Hi gear position is set according to the engine rotation speed Ne and the specified gear position of the transmission 60 (step S620). The procedure of setting the first threshold value B2 in this embodiment experimentally or otherwise determines the value of the 360-degree difference $\Delta 360$ in the consecutive misfire state of the engine 22 corresponding to the engine rotation speed Ne at the Hi gear position of the transmission 60. The procedure refers to this experimental result and specifies and stores a variation in first threshold value B2 ensuring highly accurate detection of the consecutive misfire state of the engine 22 against the rotation speed Ne of the engine 22 as the first threshold value setting map of FIG. 5 in the ROM 24$b$. The procedure reads the first threshold value B2 corresponding to the given gear position of the transmission 60 (the Hi gear position in this flow) and the given engine rotation speed Ne from the first threshold value setting map. As mentioned previously, the first threshold value B2 is set to be smaller than the first threshold value B1. The threshold values used for detection of consecutive misfires are changed according to the gear position of the transmission 60, because of the following reason. The gear ratio of the rotating shaft 48 of the motor MG2 to the ring gear shaft 32$a$ of the power distribution integration mechanism 30 linked with the crankshaft 26 of the engine 22 is varied according to the gear position of the transmission 60. The changed gear position may thus vary the effects of the operating conditions of the transmission 60 and the power distribution integration mechanism 30 on the crankshaft 26 of the engine 22 via the damper 28. The first threshold value B2 for the tentative decision on consecutive misfires at the Hi gear position is identical with the first threshold value A2 for the tentative decision on a single misfire at the Hi gear position over the whole range of the engine rotation speed Ne.

Figure 10:
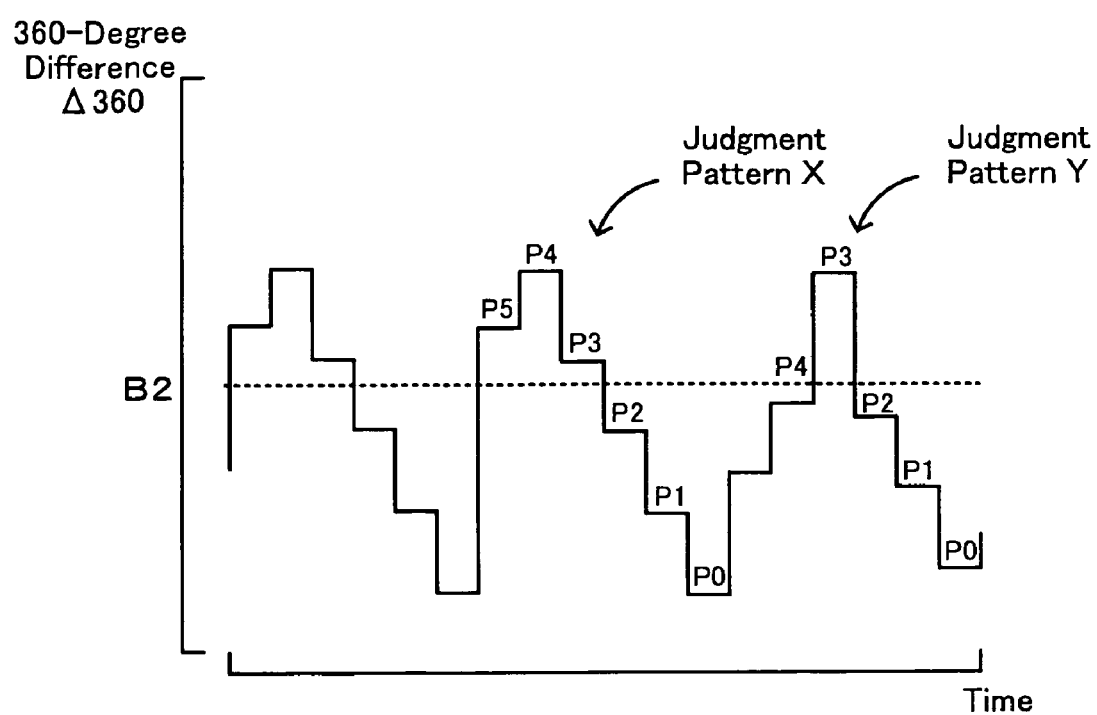
FIG. 10 is a chart showing a variation in 360-degree difference Δ360 in the consecutive misfire state at the Hi gear position of the transmission 60.

After setting the first threshold value B2, the CPU 24$a$ identifies whether the consecutive misfire tentative decision flag F2 is equal to 1 (step S630). When the consecutive misfire tentative decision flag F2 is not equal to 1 but is equal to 0, the CPU 24$a$ determines whether the 360-degree difference $\Delta 360$ exceeds the first threshold value B2 (step S640). When the 360-degree difference $\Delta 360$ does not exceed the first threshold value B2, the target cylinder of the consecutive misfire identification is identified as no consecutively-misfired cylinder. The CPU 24$a$ thus immediately terminates this consecutive misfire identification routine. When the 360-degree difference $\Delta 360$ exceeds the first threshold value B2, on the other hand, there is a possibility that the target cylinder of the consecutive misfire identification is a consecutively-misfired cylinder. In this case, the CPU 24$a$ makes a tentative decision on the occurrence of a consecutive misfire in the target cylinder and sets the value '1' to the consecutive misfire tentative decision flag F2 (step S650). The CPU 24$a$ then performs the setting process of the misfired cylinder P3 (step S660) in the same manner as the setting process of step S550 described above. FIG. 10 is a chart showing a variation in 360-degree difference $\Delta 360$ in the consecutive misfire state at the Hi gear position of the transmission 60. In the chart of FIG. 10, a last cylinder having the 360-degree difference $\Delta 360$ exceeding the first threshold value B2 among at least one cylinder detected to have the 360-degree difference $\Delta 360$ exceeding the first threshold value B2 is specified as the misfired cylinder P3. Cylinders explosively combusted immediately and second before the misfired cylinder P3 are respectively shown as pre-misfire cylinders P4 and P5. Cylinders explosively combusted immediately, second, and third after the misfired cylinder P3 are respectively shown as post-misfire cylinders P2, P1, and P0. In the consecutive misfire state at the Hi gear position, there are two different judgment patterns X and Y for a variation in 360-degree difference $\Delta 360$.

After the setting process of the misfired cylinder P3, the CPU 24$a$ determines whether decision indexes Jb1, Jb2, Jb3, and Jb5 used for the final decision of consecutive misfires are computable (step S670) in the similar manner to the determination of step S560. When the decision indexes Jb1, Jb2, Jb3, and Jb5 are not computable, the CPU 24$a$ terminates the consecutive misfire identification routine. In the course of repetition of this consecutive misfire identification routine with setting of the first threshold value B2 at step S620, identification of the consecutive misfire tentative decision flag F2 as 1 at step S630, and setting the misfired cylinder P3 at step S660, the decision indexes Jb1, Jb2, Jb3, and Jb5 are determined as computable at step S670. In response to the computable determination, the decision indexes Jb1, Jb2, Jb3, and Jb5 are actually computed (step S680). The decision index Jb1 represents a ratio $\Delta 360$(P4)/$\Delta 360$(P3) of the 360-degree difference $\Delta 360$(P4) of the pre-misfire cylinder P4 explosively combusted immediately before the misfired cylinder P3 to the 360-degree difference $\Delta 360$(P3) of the misfired cylinder P3. The decision index Jb2 represents a ratio $\Delta 360(P2)/\Delta 360(P3)$ of the 360-degree difference $\Delta 360(P2)$ of the post-misfire cylinder P2 explosively combusted immediately after the misfired cylinder P3 to the 360-degree difference $\Delta 360(P3)$ of the misfired cylinder P3. The decision index Jb3 represents a ratio $|\Delta 360(P0)|/\Delta 360(P3)$ of the absolute value of the 360-degree difference $\Delta 360(P0)$ of the post-misfire cylinder P0 explosively combusted third after the misfired cylinder P3 to the 360-degree difference $\Delta 360(P3)$ of the misfired cylinder P3. The decision index Jb5 represents a ratio $\Delta 360(P5)/\Delta 360(P3)$ of the 360-degree difference $\Delta 360(P5)$ of the pre-misfire cylinder P5 explosively combusted second before the misfired cylinder P3 to the 360-degree difference $\Delta 360(P3)$ of the misfired cylinder P3.

Second threshold values B22, B23, B24, B25, and B26 to be referred to for the final decision of consecutive misfires at the Hi gear position in the judgment pattern X (see FIG. 10) are then set according to the specified gear position and the engine rotation speed Ne (step S690). The second threshold values B22 and B23 respectively represent a lower limit and an upper limit in a varying range of the ratio $\Delta 360(P4)/\Delta 360(P3)$ of the 360-degree difference $\Delta 360(P4)$ of the pre-misfire cylinder P4 explosively combusted immediately before the misfired cylinder P3 to the 360-degree difference $\Delta 360(P3)$ of the misfired cylinder P3 in the consecutive misfire state at the Hi gear position. The second threshold value B24 represents an upper limit in a varying range of the ratio $\Delta 360(P2)/\Delta 360(P3)$ of the 360-degree difference $\Delta 360(P2)$ of the post-misfire cylinder P2 explosively combusted immediately after the misfired cylinder P3 to the 360-degree difference $\Delta 360(P3)$ of the misfired cylinder P3 in the consecutive misfire state at the Hi gear position. The second threshold value B25 represents a lower limit in a varying range of the ratio $|\Delta 360(P0)|/\Delta 360(P3)$ of the absolute value of the 360-degree difference $\Delta 360(P0)$ of the post-misfire cylinder P0 explosively combusted third after the misfired cylinder P3 to the 360-degree difference $\Delta 360(P3)$ of the misfired cylinder P3 in the consecutive misfire state at the Hi gear position. The second threshold value B26 represents an upper limit in a varying range of the ratio $\Delta 360(P5)/\Delta 360(P3)$ of the 360-degree difference $\Delta 360(P5)$ of the pre-misfire cylinder P5 explosively combusted second before the misfired cylinder P3 to the 360-degree difference $\Delta 360(P3)$ of the misfired cylinder P3 in the consecutive misfire state at the Hi gear position. The procedure of setting the second threshold values B22, B23, B24, B25, and B26 in this embodiment stores experimentally or otherwise specified variations of these second threshold values B22, B23, B24, B25, and B26 against the engine rotation speed Ne and the gear position (the Hi gear position in this flow) as a map in the ROM 24b and reads the second threshold values B22, B23, B24, B25, and B26 corresponding to the given gear position and the given engine rotation speed Ne from the map in the ROM 24b.

Second threshold values B27, B28, B29, B30, and B31 to be referred to for the final decision of consecutive misfires at the Hi gear position in the judgment pattern Y (see FIG. 10) are then set according to the specified gear position and the engine rotation speed Ne (step S700). The second threshold values B27 and B28 respectively represent a lower limit and an upper limit in a varying range of the ratio $\Delta 360(P4)/\Delta 360(P3)$ of the 360-degree difference $\Delta 360(P4)$ of the pre-misfire cylinder P4 explosively combusted immediately before the misfired cylinder P3 to the 360-degree difference $\Delta 360(P3)$ of the misfired cylinder P3 in the consecutive misfire state at the Hi gear position. The second threshold values B29 and B30 respectively represent a lower limit and an upper limit in a varying range of the ratio $\Delta 360(P2)/\Delta 360(P3)$ of the 360-degree difference $\Delta 360(P2)$ of the post-misfire cylinder P2 explosively combusted immediately after the misfired cylinder P3 to the 360-degree difference $\Delta 360(P3)$ of the misfired cylinder P3 in the consecutive misfire state at the Hi gear position. The second threshold value B31 represents a lower limit in a varying range of the ratio $|\Delta 360(P0)|/\Delta 360(P3)$ of the absolute value of the 360-degree difference $\Delta 360(P0)$ of the post-misfire cylinder P0 explosively combusted third after the misfired cylinder P3 to the 360-degree difference $\Delta 360$ (P3) of the misfired cylinder P3 in the consecutive misfire state at the Hi gear position. The procedure of setting the second threshold values B27, B28, B29, B30, and B31 in this embodiment stores experimentally or otherwise specified variations of these second threshold values B27, B28, B29, B30, and B31 against the engine rotation speed Ne and the gear position (the Hi gear position in this flow) as a map in the ROM 24b and reads the second threshold values B27, B28, B29, B30, and B31 corresponding to the given gear position and the given engine rotation speed Ne from the map in the ROM 24b.

After setting the second threshold values B27 through B31 according to the specified gear position and the engine rotation speed Ne, the CPU 24a determines whether the computed decision indexes Jb1, Jb2, Jb3, and Jb5 are respectively in the ranges defined by the second threshold values B22 through B26 (step S710). The determination result of step S710 identifies whether the tentatively judged misfire is consecutive misfires in the judgment pattern X at the Hi gear position of the transmission 60. When any of the computed decision indexes Jb1, Jb2, Jb3, and Jb5 are not in the ranges defined by the second threshold values B22 through B26, it is determined that the tentatively judged misfire is not consecutive misfires in the judgment pattern X. The CPU 24a subsequently determines whether the computed decision indexes Jb1, Jb2, Jb3, and Jb5 are respectively in the ranges defined by the second threshold values B27 through B31 (step S720). The determination result of step S720 identifies whether the tentatively judged misfire is consecutive misfires in the judgment pattern Y at the Hi gear position of the transmission 60. When any of the computed decision indexes Jb1, Jb2, Jb3, and Jb5 are not in the ranges defined by the second threshold values B27 through B31, it is determined that the tentatively judged misfire is not consecutive misfires. The CPU 24a then sets 0 to the consecutive misfire tentative decision flag F2 (step S730) and terminates the consecutive misfire identification routine. When all of the computed decision indexes Jb1, Jb2, Jb3, and Jb5 are in the ranges defined by the second threshold values B22 through B26 at step S710 or when all of the computed decision indexes Jb1, Jb2, Jb3, and Jb5 are in the ranges defined by the second threshold values B27 through B31 at step S720, the final decision is made to determine that the tentatively judged misfire is consecutive misfires. The CPU 24a then outputs the occurrence of consecutive misfires (step S610) and terminates the consecutive misfire identification routine.

In the engine misfire detection apparatus for internal combustion engine mounted on the hybrid vehicle 20 of the embodiment described above, the engine misfire detection process calculates the 30-degree rotation times T30 corresponding to the crank angles CA of the engine 22, computes the 360-degree differences $\Delta 360$ from the 30-degree rotation times T30, sets the threshold values (first threshold values A1 and A2, first threshold values B1 and B, second threshold values Alt through A24, and second threshold values B12 through B31) to be referred for identification of the engine misfire pattern according to the gear position of the transmission 60, and identifies the engine misfire pattern based on the computed 360-degree differences $\Delta 360$ and the set threshold values. The change gear ratio of the rotating shaft 48 of the motor MG2 to the ring gear shaft 32a mechanically linked with the crankshaft 26 of the engine 22 is varied according to the gear position of the transmission 60. The changed gear position may thus vary the effects of the operating conditions of the motor MG2 and the transmission 60 on the crankshaft 26 of the engine 22 via the damper 28. The threshold values used for detection of the engine misfire are set according to the gear position of the transmission 60. This arrangement of the embodiment ensures accurate detection of a misfire in the engine 22.

At the higher gear position of the transmission 60, the smaller values are set to the first threshold values A1 and A2 for the tentative decision on a single misfire and to the first threshold values B1 and B2 for the tentative decision on consecutive misfires. Namely the threshold values used for detection of engine misfires are adequately set corresponding to the gear position of the transmission 60. The first threshold values A1 and A2 and the first threshold values B1 and B2 are set to decrease with an increase in rotation speed Ne of the engine 22. Namely the threshold values used for detection of engine misfires are adequately set corresponding to the rotation speed Ne of the engine 22. The tentative decision on engine misfire is made when the 360-degree difference $\Delta 360$ is greater than the corresponding one of the first threshold values A1, A2 and the first threshold values B1 and B2. After the tentative decision on the engine misfire, the final decision on the engine misfire is made when the 360-degree differences $\Delta 360$ are in the ranges defined by the corresponding ones of the second threshold values A12 through A24 and the second threshold values B12 through B31. The engine misfire detection process of this embodiment makes the tentative decision and the final decision on the engine misfire in the above manner and thus desirably enhances the accuracy of detection of the engine misfire. The first threshold values and the second threshold values used respectively for the tentative decision and for the final decision on the engine misfire are set according to the gear position of the transmission 60. This further enhances the accuracy of detection of the engine misfire. When the engine rotation speed Ne is out of a predetermined range, identical values are set to the first threshold values for the single misfire and to the first threshold values for the consecutive misfires. This desirably simplifies the detection of the engine misfire. When the engine rotation speed Ne is within the predetermined range, on the other hand, different values are set to the first threshold values for the single misfire and to the first threshold values for the consecutive misfires. This desirably enhances the accuracy of detection of the engine misfire.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

In the embodiment described above, the single misfire identification process at the Lo gear position of the transmission 60 makes the final decision on the occurrence of a single misfire in the engine 22, based on the result of the determination whether the decision indexes Ja1, Ja2, and Ja3 are in the ranges defined by the second threshold values A12, A13, and A14. In one possible modification, any two of these three decision indexes Ja1, Ja2, and Ja3 may be used for the final decision on a single misfire. In another possible modification, anyone of these three decision indexes Ja1, Ja2, and Ja3 may be used for the final decision on a single misfire. Decision indexes different from these decision indexes Ja1, Ja2, and Ja3 may alternatively be used for the final decision on a single misfire. Such modifications are also applicable to the single misfire identification process at the Hi gear position of the transmission 60, as well as to the consecutive misfire identification process at the Lo gear position and at the Hi gear position of the transmission 60.

Figure 11:
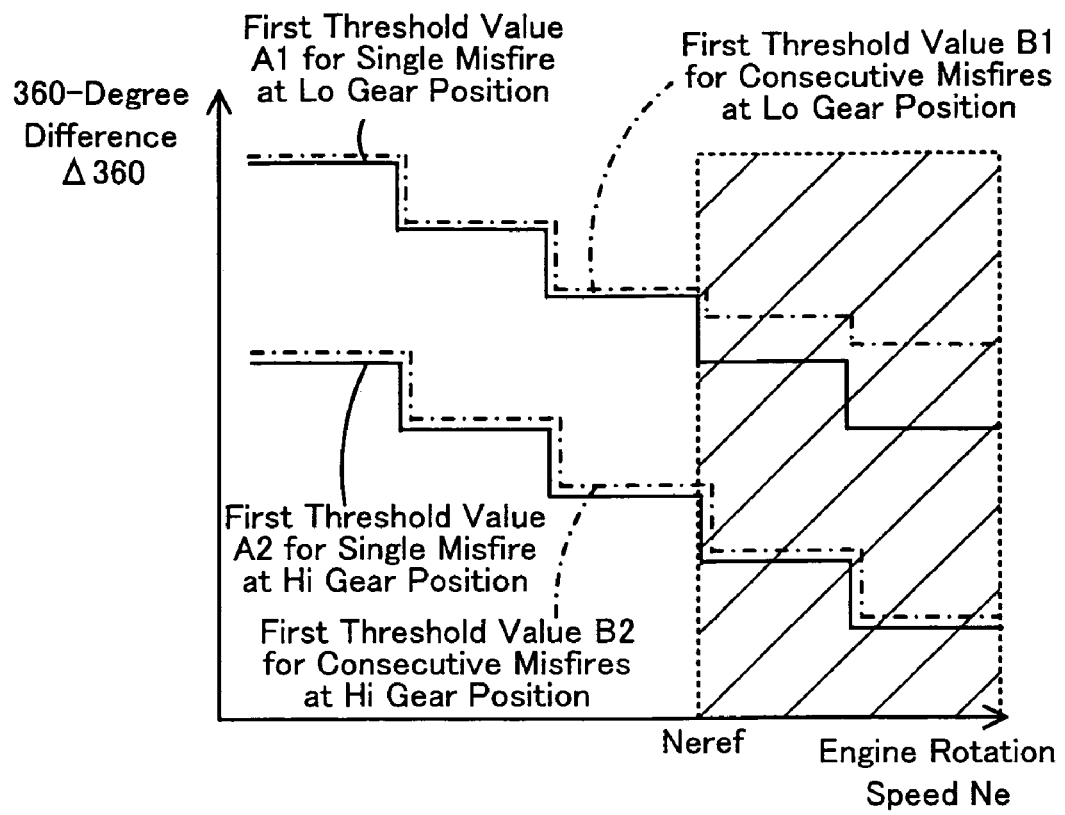
FIG. 11 shows another example of the first threshold value setting map representing variations of the first threshold values against the engine rotation speed Ne and the current gear position.

The engine misfire pattern identification process of the embodiment uses the first threshold value setting map of FIG. 5 to set the first threshold values linearly varying in proportion to the engine rotation speed Ne. The first threshold value setting map of FIG. 5 may be replaced by another first threshold value setting map shown in FIG. 11 that sets the first threshold values varying stepwise.

The hybrid vehicle 20 of the embodiment uses the transmission 60 having the two different gear positions, that is, the Lo gear position and the Hi gear position. The technique of the invention is also applicable to a transmission having three or more different gear positions. In this application, threshold values used for detection of engine misfires may be set corresponding to each of the multiple different gear positions.

The above embodiment regards the hybrid vehicle 20 equipped with the six-cylinder engine 22. The technique of the invention is also applicable to hybrid vehicles equipped with engines having various numbers of cylinders, for example, a hybrid vehicle equipped with a four-cylinder engine and a hybrid vehicle equipped with an eight-cylinder engine. The first threshold values used for the tentative decision on the engine misfire and the second threshold values used for the final decision on the engine misfire are empirically determined according to the gear ratio of the transmission 60 in each of such hybrid vehicles.

In the embodiment described above, the technique of the invention is applied to both the detection of a single misfire and the detection of consecutive misfires. The technique of the invention may be applied to only the detection of a single misfire or to only the detection of consecutive misfires. The technique of the invention is also applicable to detection of another engine misfire pattern other than the single misfire and the consecutive misfires, for example, intermittent misfires where two cylinders across one combusted cylinder are misfired among multiple cylinders.

The engine misfire detection process of the embodiment detects the engine misfire, based on the 360-degree differences $\Delta 360$ calculated from the 30-degree rotation time T30. The 360-degree differences $\Delta 360$ is, however, not essential for detection of engine misfire. A 120-degree difference $\Delta 120$ given as a difference between the currently input 30-degree rotation time T30 and a previous 30-degree rotation time T30 input 120 degrees before or a 720-degree difference $\Delta 720$ given as a difference between the currently input 30-degree rotation time T30 and a previous 30-degree rotation time T30 input 720 degrees before may be used for the same purpose. The 30-degree rotation time T30 may be used directly for detection of engine misfire. The rotation speed of the crankshaft 26 may be used as a parameter of the 30-degree rotation time T30.

The technique of the invention is not restricted to the engine misfire detection apparatus for the engine 22 mounted on hybrid vehicles but is also applicable to the engine misfire detection apparatus for the engine 22 mounted on various moving bodies other than motor vehicles, as well as the engine misfire detection apparatus for the engine 22 built in stationary equipment, such as construction machinery. Another application of the invention is an engine misfire detection method for detecting misfires of the engine 22.

The present application claims the benefit of priority from Japanese Patent Application No. 2006-19031 filed on Jan. 27, 2006, the entire contents of which are incorporated herein by reference.

INDUSTRIAL APPLICABILITY

The technique of the invention is preferably applicable to the motor vehicle-related industries including automobiles, buses, and motortrucks, as well as to transport vehicle-related industries including train cars, boats and ships, and aircraft.

The invention claimed is:

1. An engine misfire detection apparatus for detection of a misfire in a multi-cylinder internal combustion engine included in a power output apparatus, where the power output apparatus includes the multi-cylinder internal combustion engine having a crankshaft mechanically linked with a driveshaft, a motor that outputs power to the driveshaft, and a transmission mechanism that transmits power between a rotating shaft of the motor and the driveshaft with a change in gear position, the engine misfire detection apparatus comprising:
a rotational position detection unit that detects a rotational position of the crankshaft of the internal combustion engine;
a unit angle rotation time computation module that computes a unit angle rotation time required for rotation of an output shaft of the internal combustion engine by every predetermined unit rotation angle according to the detected rotational position;
a threshold value setting module that sets a first threshold value and a range of second threshold values to be used for detection of an engine misfire according to a gear position of the transmission mechanism; and
an engine misfire detection module that performs an engine misfire detection, the engine misfire detection making a tentative decision on an engine misfire when any of the computed unit angle rotation times is greater than the first threshold value,
after the tentative decision on the engine misfire, the engine misfire detection specifying an object unit angle rotation time that is greater than the first threshold value among the computed unit angle rotation times and making a final decision on the engine misfire when a ratio of a unit angle rotation time of a different cylinder, which is different from a target cylinder corresponding to the specified object unit angle rotation time, to the specified object unit angle rotation time is in the range of second threshold values.

2. The engine misfire detection apparatus in accordance with claim 1, wherein the threshold value setting module sets a smaller value to the first threshold value at a higher gear position of the transmission mechanism.

3. The engine misfire detection apparatus in accordance with claim 1, wherein the threshold value setting module sets the first threshold value to decrease with an increase in rotation speed of the internal combustion engine.

4. The engine misfire detection apparatus in accordance with claim 1, wherein when a rotation speed of the internal combustion engine is out of a predetermined range, the threshold value setting module sets an identical value to the first threshold value used for detection of an engine misfire in a preset first misfire pattern and to the first threshold value used for detection of an engine misfire in a preset second misfire pattern, and when the rotation speed of the internal combustion engine is within the predetermined range, the threshold value setting module sets different values to the first threshold value used for detection of the engine misfire in the preset first misfire pattern and to the first threshold value used for detection of the engine misfire in the preset second misfire pattern, and
the engine misfire detection module detects the engine misfire in the preset first misfire pattern based on the computed unit angle rotation times and the set first threshold value used for detection of the engine misfire in the preset first misfire pattern, while detecting the engine misfire in the preset second misfire pattern based on the computed unit angle rotation times and the set first threshold value used for detection of the engine misfire in the preset second misfire pattern.

5. The engine misfire detection apparatus in accordance with claim 1, wherein the threshold value setting module sets the first threshold value for a single misfire used for detection of an engine misfire in a single misfire pattern where only one cylinder among the multiple cylinders is misfired as the first threshold value used for detection of the engine misfire in the preset first misfire pattern, and the threshold value setting module sets a first threshold value for consecutive misfires used for detection of an engine misfire in a consecutive misfire pattern where two consecutive cylinders among the multiple cylinders are misfired as the first threshold value used for detection of the engine misfire in the preset second misfire pattern.

6. The engine misfire detection apparatus in accordance with claim 1, wherein the power output apparatus further includes: a three shaft-type power input output mechanism that is linked to three shafts, an output shaft of the internal combustion engine, the driveshaft, and a third shaft, and inputs and outputs power from and to a residual one shaft based on powers input from and output to any two shafts among the three shafts; and a generator that inputs and outputs power from and to the third shaft.

7. A hybrid vehicle equipped with a power output apparatus and with an engine misfire detection apparatus in accordance with claim 1 for detection of a misfire in a multi-cylinder internal combustion engine included in the power output apparatus, where the power output apparatus includes: the multi-cylinder internal combustion engine having a crankshaft mechanically linked with a driveshaft; a motor that outputs power to the driveshaft; and a transmission mechanism that transmits power between a rotating shaft of the motor and the driveshaft with a change in gear position.

8. An engine misfire detection method for detecting a misfire in a multi-cylinder internal combustion engine included in a power output apparatus, where the power output apparatus includes the multi-cylinder internal combustion engine having a crankshaft mechanically linked with a driveshaft, a motor that outputs power to the driveshaft, and a transmission mechanism that transmits power between a rotating shaft of the motor and the driveshaft with a change in gear position, the engine misfire detection method comprising:
detecting a rotational position of the crankshaft of the internal combustion engine;
computing a unit angle rotation time required for rotation of an output shaft of the internal combustion engine by every predetermined unit rotation angle according to the detected rotational position;
setting a first threshold value and a range of second threshold values to be used for detection of an engine misfire according to a gear position of the transmission mechanism; and performing an engine misfire detection, where the engine misfire detection makes a tentative decision on an engine misfire when any of the computed unit angle rotation times is greater than the first threshold value, after the tentative decision on the engine misfire, the engine misfire detection specifies an object unit angle rotation time that is greater than the first threshold value among the computed unit angle rotation times and makes a final decision on the engine misfire when a ratio of a unit angle rotation time of a different cylinder, which is different from a target cylinder corresponding to the specified object unit angle rotation time, to the specified object unit angle rotation time is in the range of second threshold values.

\* \* \* \* \*